United States Patent

[11] 3,633,195

| [72] | Inventor | David C. Menzel |
| | | Dellwood, Minn. |
| [21] | Appl. No. | 874,637 |
| [22] | Filed | Nov. 6, 1969 |
| [45] | Patented | Jan. 4, 1972 |
| [73] | Assignee | Minnesota Mining and Manufacturing Company |
| | | Saint Paul, Minn. |

[54] RECORD LEVEL INDICATOR CIRCUIT
3 Claims, 1 Drawing Fig.

[52] U.S. Cl. .................................................. 340/248 C, 340/253 A
[51] Int. Cl. ............................................... G08b 5/36
[50] Field of Search ............................................ 340/248, 253, 233; 317/148.5 B

[56] References Cited
UNITED STATES PATENTS

| 3,304,441 | 2/1967 | Pelt .............................. | 340/233 X |
| 3,419,756 | 12/1968 | Philibert et al. .............. | 317/148.5 B |
| 3,519,893 | 7/1970 | Schwartz ..................... | 317/148.5 B |

Primary Examiner—John W. Caldwell
Assistant Examiner—Daniel Myer
Attorney—Kinney, Alexander, Sell, Steldt & Delahunt ABSTRACT: An incandescent indicator lamp is connected in series with an SCR across an AC electrical power source. The gate terminal of the SCR is coupled through a voltage dividing network to a lead which is connected to a recording amplifier for monitoring a communication signal. The voltage dividing network is set to cause the SCR to be triggered for enabling conduction, thereby enabling current flow therethrough to light the indicator lamp, whenever the amplitude of the monitored communication signal is of at least a predetermined record level.

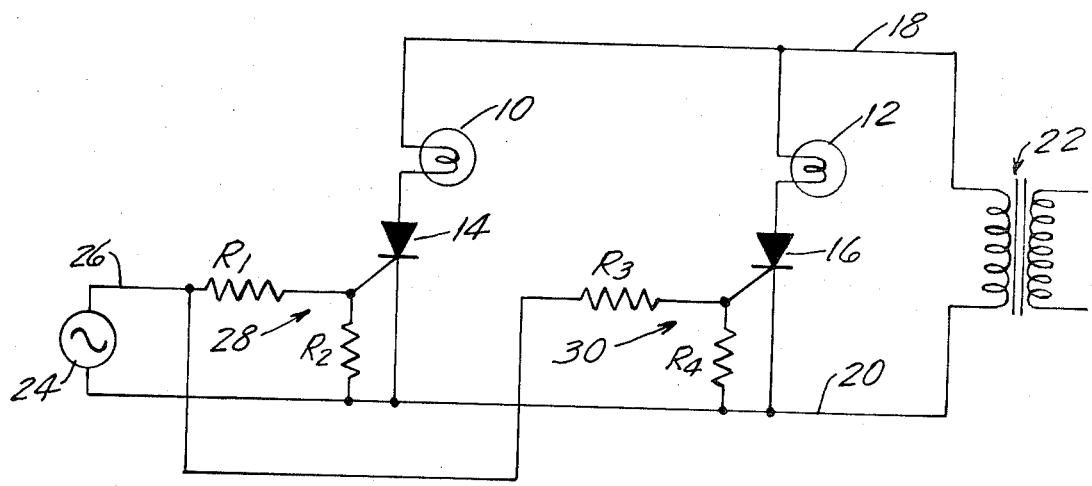

RECORD LEVEL INDICATOR CIRCUIT

BACKGROUND OF THE INVENTION

This invention pertains to a record level indicator circuit of the type used in monitoring the level of a communication signal provided at a recording amplifier output.

Prior art record level indicator circuits are described in U.S. Pat. No. 3,286,248 to Koss, and in the references cited therein. These record level indicator circuits generally provide some type of an indication that some predetermined significant signal level has been reached or exceeded, such as a record level and/or a distortion level. Distortion level, as it relates to a monitored signal, is defined as a monitored signal level at which a corresponding recorded signal is distorted. In the Koss indicator circuit, however, an incandescent lamp merely glows with greater intensity as the significant signal level is reached and exceeded. As a result, the reaching and exceeding of the significant level is not as readily detected as it is with those indicator circuits wherein a lamp glows only when the significant level is reached or exceeded.

Record level indicator circuits using neon bulbs do provide a positive on- or off-type of indication whenever a desired signal level is reached and/or exceeded. Neon bulbs, however, continue to glow after a monitored signal is reduced to slightly below the significant level. Neon bulbs do not glow as brightly as incandescent lamps. Also, when using neon bulbs, there is less flexibility in the section of different types of lamps and/or of color filters for use therewith. In addition, although a neon bulb can be used both for sensing the monitored record level and for providing an indication whenever some predetermined threshold level is exceeded, communication signals are generally of such low amplitude that they must be amplified before significant changes therein can be so sensed.

A record level indicator circuit described in U.S. Pat. No. 2,050,852 to Moore does use an incandescent lamp which is turned on whenever the monitored signal exceeds a predetermined threshold voltage level. The Moore indicator circuit, however, also has several limitations. Moors's indicator circuit is quite complex. It uses as a signal level sensor, a thyratron which is triggered for enabling conduction upon detecting that the amplitude of a monitored signal is of at least a predetermined threshold voltage level. When the thyratron conducts, current flow in a triode is cut off, which in turn causes a relay to operate a switch to turn on the indicator lamp. Moore's lamp is powered by DC voltage, and thereby requires either a DC voltage supply, such as a battery, or means of rectifying the AC line voltage. Moore's lamp does not turn of relatively instantaneously upon the monitored signal reaching the predetermined threshold voltage but is delayed in turning on by the time it takes to negatively charge a capacitor to cut off the triode current flow and by the time it takes the relay to respond after the triod current flow is cut off. The thyratron is rendered conductive upon the relay operating to turn on the lamp. The lamp remains on until the negatively charged capacitor is discharged. Also a monitored communication signal must be amplified to a level sufficient to trigger the thyratron for enabling conduction.

SUMMARY OF THE INVENTION

The present invention provides a record level indicator circuit wherein an incandescent lamp is turned on to furnish a positive indication when a monitored communication signal from a recording amplifier is of at least a predetermined threshold voltage level, by providing that the lamp be connected in series with a solid state switching means which is triggered for enabling conduction when it is detected at the gate means of the solid state switching device that the amplitude of the monitored communication signal is of at least the predetermined threshold voltage level, and by providing that the series-connected combination of solid state switching means and incandescent lamp be connected across an AC electrical power source.

An SCR is preferred as the solid state switching means. An SCR is a (silicon controlled rectifier) reverse blocking triode thyristor. Because an SCR is rendered nonconductive when current therethrough is reversed in direction, the SCR is turned off and thereby reset during a portion of each cycle of the provided AC electrical power. Other solid state switching means may also be used, such as a bidirectional triode thyristor which can be turned off when the current therethrough provided from the AC electrical poser source passes through zero.

A voltage dividing network is used for coupling a means for monitoring the communication signal to the gate means of the solid state switching means. The voltage dividing network is set to provide to the gate means of the solid state switching means the DC gate trigger voltage thereof, when the amplitude of the monitored signal is of at least a said predetermined threshold voltage level.

In a record level indicator, wherein it is desired to provide positive indications that a communication signal is exceeding a predetermined record level and/or a predetermined level corresponding to a predetermined recorded distortion percentage, two series-connected combinations of incandescent lamps and solid state switching means which are in accordance with the present invention are connected in parallel across means for monitoring the communication signal. The gate means of one solid state switching means is coupled to the monitoring means for causing a positive indication to be provided by its respective incandescent when the monitored signal is of at least a predetermined record signal level and the gate means of the other solid state switching means is coupled to the monitoring means for causing a positive indication to be provided by its respective incandescent lamp when the monitored signal is of at least a predetermined level corresponding to a predetermined recorded distortion percentage. Both series connected combinations can be connected across the same AC electrical power source.

The record level indicator circuit of the present invention provides several advantages. It is of simple construction. Because only AC electrical power is used, it may be conveniently connected to commonly available AC electrical power lines. The alternating characteristics of the AC electrical power is also utilized in turning off the indicator lamp and resetting the solid state switching means. A positive indication is provided relatively instantaneously when the communication signal is of at least the predetermined threshold voltage level. Solid state switching means may have a DC gate trigger voltage which is in the range of the amplitude of typical communication signals, thereby eliminating the necessity of amplifying the monitored signal in order to sense significant changes therein. Increases in the communication signal amplitude do not cause the lamp to glow brighter. The lamp is not burned out by a high amplitude monitored signal. Also, a relatively large amount of lamp power can be switched on and off in response to a very small change in the monitored signal power.

BRIEF DESCRIPTION OF THE DRAWING

The drawing is a schematic diagram of a record level indicator circuit embodiment of the present invention.

DESCRIPTION OF THE PREFERRED EMBODIMENT

The preferred embodiment of the present invention is a record level indicator circuit wherein incandescent lamps are provided for positively indicating when a monitored communication signal is of at least a predetermined record level and/or a predetermined level corresponding to a predetermined record distortion percentage. Each incandescent lamp is current responsive, in that it operates in an on-state when current flows therethrough.

Referring to the drawing, two standard incandescent lamps 10 and 12 are used as indicating means. The solid state switching means 14 and 16 are each SCRs, which are connected in series with the lamps 10 and 12. The lamps 10 and 12 are connected to the anodes of the SCRs 14 and 16, respectively. Means such as the conductors 18 and 20 connect a source of AC electrical power, such as the transformer 22, across each series-connected combination of lamp and SCR 10 and 14, 12 and 16.

A means for monitoring a communication signal at an amplifier output 24, such as conductor 26, is operatively coupled to the gate terminals of the SCRs 14 and 16. Voltage dividing networks 28 and 30 couple the conductor 26 to SCRs 14 and 16, respectively. The values of the resistors R1 and R2 of the voltage dividing network 28 are selected for setting the voltage dividing network 28 to provide to the gate terminal of the SCR 14 a voltage of at least the SCR 14 DC gate trigger voltage, when the amplitude of the monitored signal from the amplifier output 24 is of at least a predetermined record level. The values of resistors R3 and R4 of the voltage dividing network 30 are selected for setting the voltage dividing network 30 to provide to the gate terminal of the SCR 16 a voltage of at least the SCR 16 DC gate trigger voltage when the amplitude of the monitored signal from the amplifier output 24 is of at least a predetermined level corresponding to a predetermined record distortion percentage.

In the embodiment shown in the drawing, the following components are used when monitoring communication signals in the range of 50 Hertz to 15 Kilohertz.

| | |
|---|---|
| Lamps 10 and 12 | Type L12-αIncandescent lamps rated at 12 volts and 60 milliamps available from Mura Corporation, an importer located at Great Neck, New York. |
| SCRs 14 and 16 | Type TIC45 PNPN Planar Silicon Reverse-Blocking Triode Thyristor rated at 60 volts, available from Texas Instruments Incorporated of Dallas, Tex. |
| R1 | 2,700 ohms |
| R2 | 1,000 ohms |
| R3 | 8,200 ohms |
| R4 | 1,000 ohms |

Power transformer 22 supplies 23 volts AC to the indicator circuit from a 120 volts, 60 Hertz electrical power source. When the amplitude of the monitored communication signal is of at least a predetermined record level of 2.1 volts (1.5volts RMS), lamp 10 glows; and when the amplitude of the communication signal is of at least a predetermined level of 5.2 volts (3.7 volts RMS) which corresponds to a predetermined recorded distortion percentage of about 3 percent, lamp 12 also glows.

What is claimed is:

1. A record level indicator circuit of the type wherein an incandescent lamp glows when the amplitude of a monitored communication signal from a recording amplifier is of at least a predetermined threshold voltage level, comprising an incandescent lamp which operates in an on-state and thereby glows when current flows therethrough;

means for monitoring a communication signal from a recording amplifier;

a solid state switching means connected in series with the incandescent lamp for enabling conduction through the incandescent lamp upon the solid state switching means being triggered into conduction, and for inhibiting conduction through the incandescent lamp upon the solid state switching means being rendered nonconductive, wherein the solid state switching means includes gate means which are operatively coupled to the monitoring means for sensing a said monitored communication signal and for triggering the solid state switching means for enabling said conduction upon detecting that the amplitude of a said monitored communication signal is of at least a said predetermined threshold voltage level, wherein the solid state switching means has a DC gate trigger voltage in the range of the amplitude of a said monitored communication signal;

a voltage dividing network operatively coupled between the monitoring means and the solid state switching means, wherein the voltage dividing network is set to provide to the solid state switching means at least the DC gate trigger voltage thereof, when the amplitude of a said monitored communication signal is of at least a said predetermined threshold voltage level; and means for providing AC electrical power across the series-connected incandescent lamp and solid state switching means.

2. A signal level indicator circuit according to claim 1, wherein the solid state switching means comprises an SCR having its gate terminal operatively coupled to the monitoring means and its cathode and anode terminals in series with the indicating means.

3. A record level indicator circuit of the type wherein a first incandescent lamp glows when the amplifier is of at least a predetermined record level, and a second incandescent lamp glows when the amplitude of a said monitored communication signal from said recording amplifier is of at least a predetermined level corresponding to a predetermined recorded distortion percentage, comprising means for monitoring a communication signal from a recording amplifier;

first and second incandescent lamps;

a first solid state switching means connected in series with a first incandescent lamp for enabling conduction through the first incandescent lamp upon the first solid state switching means being triggered into conduction, and for inhibiting conduction through the first incandescent lamp upon the first solid state switching means being rendered nonconductive, wherein the first solid state switching means includes gate means which are operatively coupled to the monitoring means for sensing a said monitored communication signal and for triggering the first solid state switching means into conduction upon detecting that the amplitude of a said monitored communication signal is of at least a said predetermined record level, wherein the first solid state switching means has a DC gate trigger voltage in the range of the amplitude of a said monitored communication signal;

a first voltage dividing network operatively coupled between the monitoring means and the first solid state switching means, wherein the voltage dividing network is set to provide to the first solid state switching means at least the DC gate trigger voltage thereof, when the amplitude of a said monitored signal is of at least said predetermined record level;

a second solid state switching means connected in series with the second incandescent lamp for enabling conduction through the second incandescent lamp upon the second solid state switching means being triggered into conduction, and for inhibiting conduction through the second incandescent lamp upon the second solid state switching means being rendered non conductive, wherein the second solid state switching means includes gate means which are operatively coupled to the monitoring means for sensing a said monitored communication signal and for triggering the second solid state switching means into conduction upon detecting that the amplitude of a said monitored communication signal is of at least a said predetermined level corresponding to a predetermined recorded distortion percentage, wherein the second solid state switching means has a DC gate trigger voltage in the range of the amplitude of a said monitored communication signal;

a second voltage dividing network operatively coupled between the monitoring means and the second solid state switching means, wherein the voltage dividing network is set to provide to the second solid state switching means at least the DC gate trigger voltage thereof, when the amplitude of a said monitored signal is of at least said predetermined level corresponding to a predetermined recorded distortion percentage, and means for providing AC electrical power across each combination of series-connected incandescent lamps and solid state switching means.

* * * * *

UNITED STATES PATENT OFFICE
CERTIFICATE OF CORRECTION

Patent No. 3,633,195                     Dated January 4, 1972

Inventor(s) David C. Menzel

It is certified that error appears in the above-identified patent and that said Letters Patent are hereby corrected as shown below:

Column 1, line 49, change "of" to -- on --; and line 55, change "conductive" to -- non-conductive --.

Column 2, line 9, change "poser" to -- power --; and line 29, after "incandescent" insert -- lamp --.

Column 3, line 23, change "record" to -- recorded --; and line 27, change "L12-$\alpha$" to -- L12-60 --.

Signed and sealed this 10th day of October 1972.

(SEAL)
Attest:

EDWARD M. FLETCHER, JR.        ROBERT GOTTSCHALK
Attesting Officer               Commissioner of Patents